United States Patent
Schrage

(10) Patent No.: US 6,744,860 B1
(45) Date of Patent: Jun. 1, 2004

(54) METHODS AND APPARATUS FOR INITIATING A VOICE-DIALING OPERATION

(75) Inventor: James R. Schrage, Ridgefield, CT (US)

(73) Assignee: Bell Atlantic Network Services, Arlington, VA (US)

( * ) Notice: Subject to any disclaimer, the term of this patent is extended or adjusted under 35 U.S.C. 154(b) by 0 days.

(21) Appl. No.: 09/224,809

(22) Filed: Dec. 31, 1998

(51) Int. Cl.[7] ............................. H04M 1/64; H04M 1/00
(52) U.S. Cl. ............................... 379/88.03; 379/88.01; 379/207.02; 455/563
(58) Field of Search .................. 379/52, 388.01, 379/88.01, 88.03, 907, 69, 74, 80, 81, 88.07, 88.08, 207.06, 207.07, 207.02, 201.01, 900, 904, 442, 420; 704/201, 231, 243, 275; 455/563

(56) References Cited

U.S. PATENT DOCUMENTS

| | | | |
|---|---|---|---|
| 4,737,976 A | 4/1988 | Borth et al. ................. | 379/58 |
| 4,757,525 A | 7/1988 | Matthews et al. ............ | 379/89 |
| 4,827,500 A | 5/1989 | Binkerd et al. ............... | 379/88 |
| 4,853,953 A | 8/1989 | Fujisaki ....................... | 379/88 |
| 4,864,622 A | 9/1989 | Iida et al. .................... | 381/41 |
| 4,908,864 A | 3/1990 | Togawa et al. ............... | 381/43 |
| 4,922,538 A | 5/1990 | Tchorzewski ................. | 381/42 |
| 4,928,302 A | 5/1990 | Kaneuchi et al. ............ | 379/88 |
| 4,945,557 A | 7/1990 | Kaneuchi et al. ............ | 379/97 |
| 4,961,212 A | 10/1990 | Marui et al. .................. | 379/67 |
| 4,979,206 A | 12/1990 | Padden et al. ................ | 379/67 |
| 5,007,081 A | 4/1991 | Schmuckal et al. ......... | 379/354 |
| 5,042,063 A | 8/1991 | Sakanishi et al. ............ | 379/88 |
| 5,054,053 A | 10/1991 | Sakanishi et al. ............ | 379/63 |
| 5,091,947 A | 2/1992 | Ariyoshi et al. .............. | 381/42 |
| 5,128,982 A | 7/1992 | Dugdale et al. .............. | 379/89 |
| 5,148,471 A | 9/1992 | Metroka et al. .............. | 379/58 |
| 5,150,399 A | 9/1992 | Yasuda ........................ | 379/67 |

(List continued on next page.)

OTHER PUBLICATIONS

1994, Lubensky et al, "Connected Digit Recognition Using Connectionist Probability Estimators and Mixture–Gaussian Densities", *1994 International Conference on Spoken language Processing,* Sep. 18–22, 1994, Yokohama, Japan pp. 295–298.

(List continued on next page.)

*Primary Examiner*—Fan Tsang
*Assistant Examiner*—Ovidio Escalante
(74) *Attorney, Agent, or Firm*—Straub & Pokotylo; Michael P. Straub

(57) ABSTRACT

Hands free voice dialing telephony devices that can perform relatively simple speech recognition, e.g., to recognize one or a few words corresponding to a command to initiate voice dialing, are described. Speech recognition models stored in the telephony devices can be relatively small and may be either of a speaker dependent or speaker independent type. In response to detecting a command to perform a voice dialing operation the telephony device establishes a connection with a voice dialing intelligent peripheral (IP). The IP includes far greater speech recognition capabilities than the individual telephone devices and is responsible for supporting voice dialing operations associated with a plurality of voice dialing service subscribers. The IP performs speech recognition on speech provided by individual telephony devices and outputs telephone numbers corresponding to recognized spoken names. Telephony devices are coupled by the telephone network to destination telephones corresponding to the telephone numbers output by the IP. In one embodiment, speech recognition models are generated by the IP from speech transmitted from the individual telephony devices. The generated model or models are then stored in the telephony devices for use during speech recognition operations. Thus, processing resources required to generate speech recognition models can be located in a centralized network accessible location.

16 Claims, 6 Drawing Sheets

U.S. PATENT DOCUMENTS

| | | | | |
|---|---|---|---|---|
| 5,165,095 | A | * 11/1992 | Borcherding | 379/88 |
| 5,181,237 | A | 1/1993 | Dowden et al. | 379/88 |
| 5,297,183 | A | 3/1994 | Bareis et al. | 379/59 |
| 5,315,649 | A | 5/1994 | Foster et al. | 379/355 |
| 5,319,703 | A | 6/1994 | Drory | 379/351 |
| 5,325,421 | A | 6/1994 | Hou et al. | 379/67 |
| 5,335,261 | A | 8/1994 | Fujinaka | 379/58 |
| 5,365,574 | A | 11/1994 | Hunt et al. | 379/88 |
| 5,369,685 | A | 11/1994 | Kero | 379/67 |
| 5,371,779 | A | 12/1994 | Kobayashi | 379/58 |
| 5,375,164 | A | 12/1994 | Jennings | 379/88 |
| 5,384,833 | A | 1/1995 | Cameron | 379/67 |
| 5,390,278 | A | 2/1995 | Gupta et al. | 395/2.52 |
| 5,404,422 | A | 4/1995 | Sakamoto et al. | 395/2.41 |
| 5,406,618 | A | 4/1995 | Knuth et al. | 379/67 |
| 5,420,912 | A | 5/1995 | Kopp et al. | 379/63 |
| 5,425,128 | A | 6/1995 | Morrison | 395/2.52 |
| 5,428,608 | A | 6/1995 | Freeman et al. | 370/60.1 |
| 5,452,289 | A | 9/1995 | Sharma et al. | 370/32.1 |
| 5,457,770 | A | 10/1995 | Miyazawa | 395/2.64 |
| 5,463,677 | A | 10/1995 | Bash et al. | 379/88 |
| 5,463,685 | A | 10/1995 | Gaechter et al. | 379/207 |
| 5,463,715 | A | 10/1995 | Gagnon | 395/2.76 |
| 5,594,784 | A | * 1/1997 | Velius | 379/88.01 |
| 5,719,921 | A | 2/1998 | Vysotsky et al. | 379/88 |
| 5,960,399 | A | * 9/1999 | Barclay et al. | 704/270 |
| 5,963,639 | A | * 10/1999 | Kanamaki | 379/418 |
| 6,049,594 | A | * 4/2000 | Furman et al. | 379/88.03 |
| 6,049,604 | A | * 4/2000 | Lin | 379/355 |
| 6,128,482 | A | * 10/2000 | Nixon et al. | 379/88.01 |
| 6,157,848 | A | * 12/2000 | Bareis et al. | 379/88.01 |
| 6,185,535 | B1 | * 2/2001 | Hedin et al. | 704/270 |
| 6,216,013 | B1 | * 4/2001 | Moore et al. | 455/563 |
| 6,236,715 | B1 | * 5/2001 | Wong | 379/88.03 |
| 6,400,967 | B1 | * 6/2002 | Nilsson | 379/88.03 |
| 6,487,277 | B2 | * 11/2002 | Beyda et al. | 379/88.01 |

OTHER PUBLICATIONS

1994, Naik, Jay "Field Trial of a Speaker Verification Service for Caller Identity Verification in the Telephone Network", *2nd IEEE Workshop on Interactive Voice Technology for Telecommunications Applications,* Sep. 26–27, 1994, Kytro, Japan, pp. 125–128.

1994, Vysotsky, George J. "Voicedialing—The First Speech Recognition Based Telephone Service Delivered to Customer's Home", *2$^{nd}$ IEEE Workshop on Interactive Voice Technology for Telecommunications Applications,* Sep. 26–27, 1994, Kyto, Japan, pp. 150–152.

* cited by examiner

METHODS AND APPARATUS FOR INITIATING A VOICE-DIALING OPERATION

FIELD OF THE INVENTION

The present invention is directed to communications systems and, more particularly, to communications systems which support voice operations, e.g., voice-dialing operations.

BACKGROUND OF THE INVENTION

People frequently have difficulty remembering all of the telephone numbers that they use. In addition, many people, e.g., physically handicapped individuals, find it difficult to manually enter a telephone number into a telephone set, e.g., by depressing buttons on a telephone.

In order to facilitate dialing of telephone numbers, voice-dialing telephone services have been introduced. Once connected to a service provider, known voice-dialing services allow a caller to dial a telephone number by simply speaking a dial command followed by the name of the party to be called and/or by simply stating the name of the party to be called. Speech recognition is used in the known voice-dialing services to identify the party to be called. Once the spoken name of the party is identified, the voice-dialing service dials a telephone number associated with the identified name, thereby eliminating the need for the voice-dialing subscriber to enter the telephone number of the party to be called.

Known voice-dialing services of the type described above are frequently implemented using an intelligent peripheral, e.g., a voice-dialing platform with speech recognition capabilities, coupled to a central office (CO) switch. FIG. 1 illustrates a representative known telephone system 10. As illustrated, the telephone system 10 comprises first and second telephones 12, cell phone 14 with antenna 15, and a public switched telephone network (PSTN) 16. PSTN 16 comprises a CO switch 20, a mobile telephone switching office (MTSO) switch 22 and an intelligent peripheral (IP) 18 capable of performing voice-dialing services. The MTSO switch 22 includes an antenna 23 for communicating with cell phone 14 via antenna 15. The first and second telephones 12 may be, e.g., MINDSET telephones produced by XINEX corporation which include an RS232 interface.

One problem with the system 10 is that a call must be connected to the IP 18 before a voice-dialing service can be provided. In the known system 10, the caller may contact the IP 18 in two ways: the first way involves dialing a telephone number corresponding to the IP 18; and the second way involves initiating an off-hook condition, which automatically results in connecting a voice-dialing subscriber to the IP 18 for voice-dialing services. The second approach for connecting a voice-dialing subscriber involves the use of what has become known as the NFA protocol. A description of the second approach for connecting a service subscriber to an IP can be found in U.S. Pat. No. 5,784,437.

Use of the NFA protocol can eliminate the need to perform a dialing operation in order to contact an IP18 so that a voice-dialing service can be performed. As such, use of the NFA protocol eliminates the need to remember and enter the telephone number of the IP 18 that provides a voice-dialing service.

Unfortunately, even with the use of the NFA protocol, an off-hook condition must be initiated before a voice-dialing operation can be performed. The physical action of lifting a handset or pressing a button to initiate an off-hook condition can be difficult or impossible for some handicapped individuals. In addition, from a convenience standpoint, it is desirable that the need to perform a physical lifting or switching act be eliminated so that a telephone call can be initiated without the use of hands. The ability to perform a hands-free dialing operation is appealing, from a convenience standpoint, to many business, home and cellular phone users. In addition for cellular phone users operating a motor vehicle, the ability to initiate a dialing operation without having to use one's hands offers important safety advantages to methods which require the removal of a hand from a steering wheel.

SUMMARY OF THE PRESENT INVENTION

The present invention is directed to communications systems and methods and, more particularly, to methods and apparatus for implementing hands-free dialing operations.

In accordance with one embodiment of the present invention, an intelligent speakerphone, when not in an off-hook condition, is programmed to monitor ambient sounds to detect particular speech corresponding to a command to initiate a voice-dialing operation. The speakerphone's microphone may be used to detect audio signals, which are processed by a processing unit within the speakerphone to detect a voice-dialing command. When off-hook the speakerphone may monitor for a verbal hang-up command.

Upon detecting a command or other acoustic signal used to initiate a voice-dialing operation, the speakerphone of the present invention initiates an off-hook condition. In an embodiment where the NFA protocol is used, the off-hook condition results in the caller being connected to a voice-dialing IP, thereby allowing the user of the telephone to proceed with a voice-dialing call. In embodiments where the NFA protocol is not supported, e.g., in some cellular telephone embodiments, the speakerphone of the present invention automatically dials the voice-dialing IP after initiating an off-hook condition. The dialing is automatically performed in response to the same command or signal used to initiate the voice-dialing operation. The telephone of the present invention may automatically provide the voice-dialing IP a subscriber's personal identification number (PIN) in embodiments where such information is used to perform a voice-dialing operation.

Once connected to the IP, the IP performs a voice dialing operation in a conventional manner. In such an embodiment, the IP performs speech recognition of names of individuals and outputs the telephone number's associated therewith. In this manner, the IP which is a shared resource is responsible for the majority of the speech recognition required to perform a complete voice dialing operation which the telephony device of the present invention only has to be capable of recognizing a single word or phrase corresponding to a dial command. In such an embodiment, the IP will normally support a vocabulary that is many times larger than the vocabulary supported by the telephony device used to initiate the voice dialing operation.

Since many speakerphones currently include processors, memory devices, and microphones suitable for implementing the present invention, the voice-dialing feature of the present invention may be implemented at little or no expense, in terms of hardware, beyond that already associated with manufacturing many modern speakerphones.

In addition to a speakerphone embodiment, the voice-dialing initiation method of the present invention may be used with computers capable of performing telephony operations, telephones capable of being controlled by an external device, e.g., a voice-dialing control circuit of the present invention, cellular telephones and a wide variety of other telephony devices. While the methods and apparatus of the present invention are described in the context of a voice-dialing embodiment, it is to be understood that the speech recognition and monitoring techniques of the present invention may be used to initiate other services, e.g., voice mail services, requiring control of a communications device and/or connection to an intelligent peripheral.

Speech recognition models used by the telephony devices of the present invention are, in one embodiment, generated by an IP from speech forwarded to the IP from the telephony devices. The speech recognition models may be speaker dependent models generated from an individual speaker and used by an individual telephony device or speaker independent models generated from multiple speakers. Speech recognition models generated by the IP are stored in and used by the individual telephony devices to detect signals or commands to initiate a voice dialing operation. By placing the burden of speech recognition model generation on the IP, the hardware requirements of the individual telephony devices can be minimized while allowing for powerful and sophisticated model training techniques to be used when generating models to be used by the telephone devices of the present invention.

Additional features, advantages and embodiments of the present invention are disclosed in the following detailed description when considered in connection with the accompanying drawings in which the same or similar reference characters designate like parts throughout the figures thereof.

DETAILED DESCRIPTION

Figure 1:
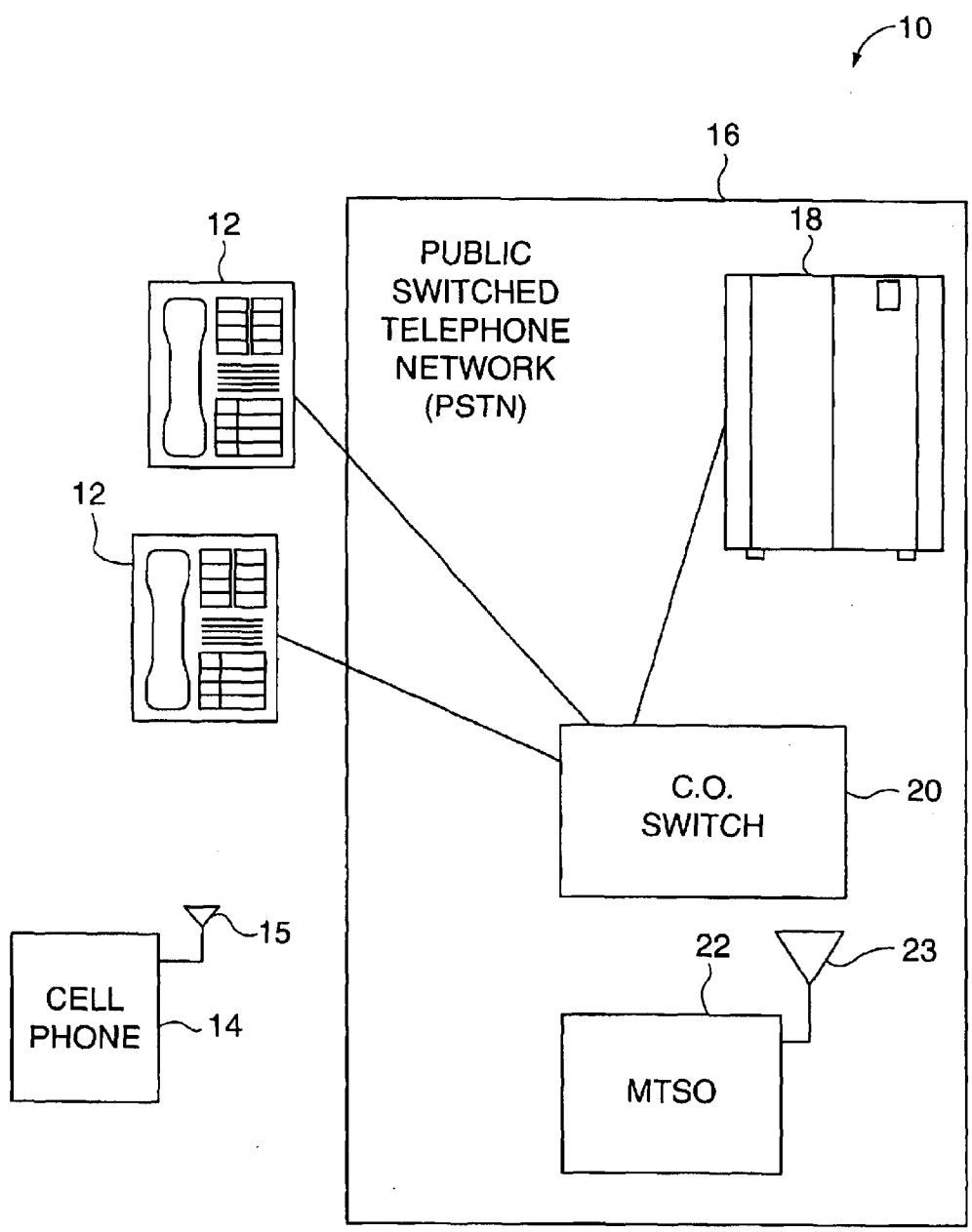
FIG. 1 is a block diagram of a known telephone system including a voice-dialing IP for providing voice-dialing services.
Figure 2:
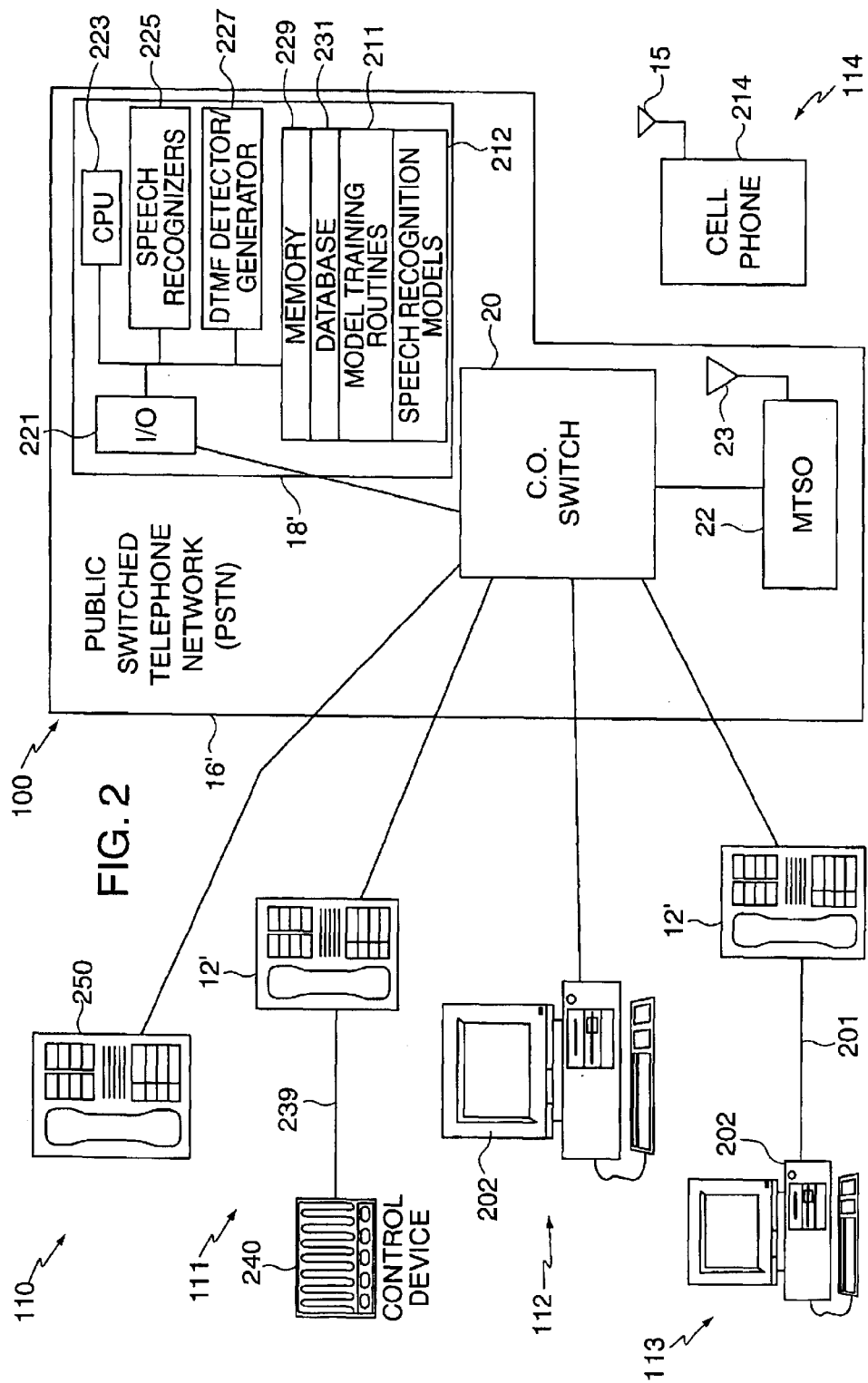
FIG. 2 illustrates a telephone system implemented in accordance with the present invention.

Referring now to the drawings, FIG. 2 shows a telephone system 100 with a public switched telephone network (PSTN) 16' that is similar to PSTN 16 of FIG. 1. In addition to having the usual PSTN components, such as CO switch 20 and MTSO switch 22, PSTN 16' further includes voice-dialing IP 18'. IP 18' may be implemented as a modified version of the conventional voice-dialing IP 18 of FIG. 1.

In the FIG. 2 embodiment, the IP 18' includes an I/O interface 221, a CPU 223, a speech recognizer circuit 225, DTMF detector/generator 227 and a memory device 229 for storing a data base 231, model training routines 211 and speech recognition models 212. The database 231 includes, e.g., speaker dependent speech recognition models and corresponding telephone numbers associated with specific voice dialing subscribers. It also includes speaker independent models for words or phrases corresponding to commands. Speaker independent speech recognition models corresponding to frequently used names, and telephone numbers associated therewith, may also be stored in the database 231.

Voice-dialing IP 18' includes the basic components and software that permit it to operate as a standard voice-dialing platform with speech recognition capabilities. In addition, voice-dialing IP 18' contains acoustic, e.g., speech model training routines 211 and acoustic, e.g., speech, models 212. Conventional model training techniques, e.g., Hidden Markov Model training techniques, may be used to generate the speech recognition models 212. The models 212 may be, e.g., speaker dependent and/or speaker independent speech recognition models. As will be discussed below, the speech models 212 can be downloaded to a communication device for use in initiating a communication operation, e.g., a voice dialing operation, or for use in other speech recognition tasks.

In embodiments where the IP 18' is not required to generate speech recognition models, a conventional IP 18 may be used in place of the modified IP 18'. Accordingly, the methods and apparatus of the present invention can be used with conventional telephone systems and conventional voice dialing IPs. U.S. Pat. No. 5,719,921 ("the 921 patent"), which is hereby incorporated by reference, describes a known IP which is used in place of the IP 18' in accordance with one embodiment of the present invention. IP operation, in such a voice dialing embodiment, occurs as described in detail in the '921 patent.

In addition to the above discussed elements, telephone system 100 further comprises an array of communication devices 110–114, each representing a different variation of a hands-free dialing device implemented in accordance with the present invention. Communication devices 110–114 may act as source or destination devices for telephone calls.

Communication device 110 includes a speakerphone 250 connected to CO switch 20. Communication device 111 includes first speakerphone 12' coupled to, and controlled by, a stand-alone voice-dialing control device 240. First speakerphone 12' also connects to CO switch 20. Communication device 112 includes first personal computer 202 connected to CO switch 20. Communication device 113 comprises second speakerphone 12' coupled to and controlled by second personal computer 202. Second speakerphone 12' also connects to CO switch 20. Finally, communication device 114 comprises a cell phone 214 capable of initiating a voice dialing operation in accordance with the present invention. The cell phone 214 includes an antenna 15 for communicating with MTSO switch 22 via its antenna 23.

In a manner described below in detail with respect to FIGS. 3–7, communication devices 110–114 employ real-time, or near real time, voice detection and recognition techniques that allow a user to perform hands-free operation when initiating a telephone call. In general, each of the communication devices 110–114 includes an ambient sound monitoring apparatus, e.g., microphone, that generates an audio output even when the associated telephony circuit is in an on-hook condition. Acoustic pattern recognition, e.g., speech recognition, of the audio output that is received from the ambient sound monitoring apparatus occurs in real time and results in initiating a telephone call when an appropriate audio command or signal is detected.

In one embodiment, a caller initiates a telephone call with one of the communication devices 110–114 by simply vocalizing a pre-selected dial command, e.g., a selected oral acoustic signal, in the vicinity of the device. Dial commands may comprise a word, a set of words or other recognizable sounds that a subscriber has chosen to initiate a dialing operation. An acoustic model, e.g., Hidden Marker Model (HMM) corresponding to the selected dial command is stored within one or more of communication devices 110–114. A subscriber may choose, e.g., to use the phrase "dial phone" for use as a dial command. In a situation where a number of such communication devices are located in close proximity to each other, a subscriber may choose a number of phrases, such as "dial a," "dial b," "dial c," etc., with the different phrases being assigned to different ones of the communication devices 110–114. Upon detecting the occurrence of an acoustic signal corresponding to a pre-selected dial command, communication devices 110–114 respond by initiating a voice dialing operation,. This usually involves establishing a connection to voice-dialing IP 18' so that the user of the communications device can proceed with a conventional voice-dialing operation. In embodiments where the communication device internally supports the ability to generate telephone numbers in response to a voice dialing command, the need to connect to an IP is avoided.

Figure 3:
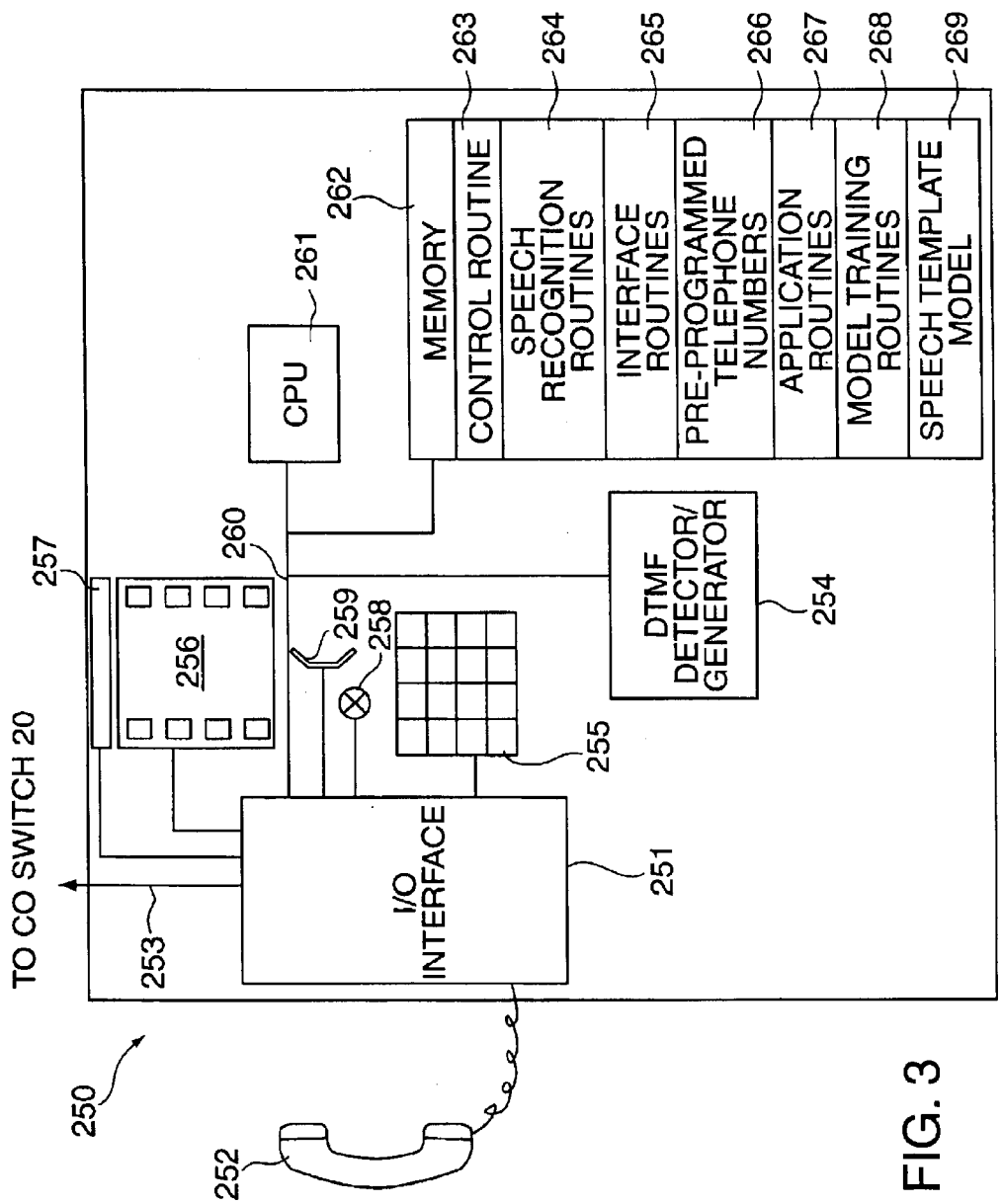
FIG. 3 illustrates a speakerphone implemented in accordance with one exemplary embodiment of the present invention.

Intelligent speakerphone 250, shown schematically in FIG. 2, is illustrated in detail in FIG. 3. As shown in FIG. 3, intelligent speakerphone 250 comprises input-output (I/O) interface 251 connected to handset 252 and telephone line 253. Telephone line 253 extends from speakerphone 250 to CO switch 20. Speakerphone 250 further includes conventional speakerphone features, such as telephone keypad 255, programmable function keys 256, display 257, microphone 258 and loudspeaker 259, all of which connect to I/O interface 251. A bus connects I/O interface 251 to central processing unit (CPU) 261, memory 262 and dualtone multiple frequency (DTMF) detector/generator 254.

Memory 262 stores instructions and data suitable for permitting speakerphone 250 to perform the typical functions associated with a standard speakerphone. For example, memory 262 stores control routine 263, which acts as an operating system that manages, controls and allocates the resources of speakerphone 250. Interface routines 265, which control I/O interface 251, are also stored in memory 262. Also stored in memory 262 are pre-programmed telephone numbers 266 and application routines 267. The pre-programmed telephone numbers are accessed in response to manual activation of one of the programmable function keys 256. The application routines 267 perform various speakerphone tasks, e.g., configuring a conference call, generating and sending call-waiting responses, etc.

In accordance with the present invention, control routine 263 controls the resources of speakerphone 250 to perform or initiate voice-dialing operations. In this regard, speakerphone 250 performs pattern, e.g., speech, recognition on audio data derived from the output of microphone 258, which remains active and monitors ambient sounds while speakerphone 250 is in an on-hook condition. Monitoring for a voice dialing command is normally not performed when in an off-hook condition. Speakerphone 250 executes speech recognition routines 264 in an attempt to recognize patterns in the audio data, corresponding to a users pre-selected dial signal or command. Speech recognition routines 264, which are in various embodiments executed in real time, need only be capable of recognizing a relatively simple dial command containing, e.g., a single word, e.g., "dial". The speech recognition models 269, used by the telephone 250, may be generated and stored using the model training routines 268. The model training routines are used during an initialization operation to model speech provided by the user which the user intends to use as a dial command.

During initial setup of intelligent speakerphone 250, control routine 263 instructs a subscriber, via display 257 and/or loudspeaker 259, to choose and speak a dial command, e.g., "dial," which microphone 258 picks up and sends to I/O interface 251. Interface routines 265 cause I/O interface 251 to suitably sample, digitize and format the audio input from microphone 258 before passing audio data to CPU 261 for processing by model training routines 268. During this process, a subscriber would usually be asked to repeat the dial command, e.g., "dial," a number of times. Model training routines 268 process the audio data to generate and store speech models 269 corresponding to the dial command as voiced by that subscriber.

An alternate setup procedure may be employed for generating and storing speech models 269. In the alternative embodiment, the processing resources of the IP 18' are used to generate the speech recognition models 269. To perform model generation functions, voice-dialing IP 18' comprises model training routines 211 and speech models 212 (see FIG. 2). During setup, speakerphone 250 connects to voice-dialing IP 18' and transmits one or more dial commands as they are uttered by a subscriber and detected by microphone 258. Voice-dialing IP 18' and, in particular, model training routines 211 process data derived from the transmitted dial command, and generate and then store the speech recognition models 212. CO switch 20 returns the generated speech models 212 to the speakerphone where they are stored in the memory 262 as speech models 269.

This alternative approach has several advantages over having the speakerphone 250 generate the models 269. The available data processing services typically associated with voice-dialing IP 18' will normally be significantly more powerful than what normally would be obtained from a processor incorporated in a speakerphone. In addition, updating model training routines 211 with new versions can be performed more frequently and economically than updating model training routines 268 stored in numerous telephones. Thus, it is expected that voice-dialing IP 18' could be used to generate a more accurate version of speech models 269 than might otherwise be generated using individual telephones to perform the training. In addition, the cost of speakerphone 250 and the size of memory 262 may also be reduced by having the speech models 269 generated at voice-dialing IP 18'. Accordingly, one feature of the present invention is directed to generating speech recognition models (also sometimes referred to as speech templates) at one or more centralized location's, from speech provided via a telephone device, and then storing the generated speech recognition models in the device from which the speech was provided.

Figure 4:
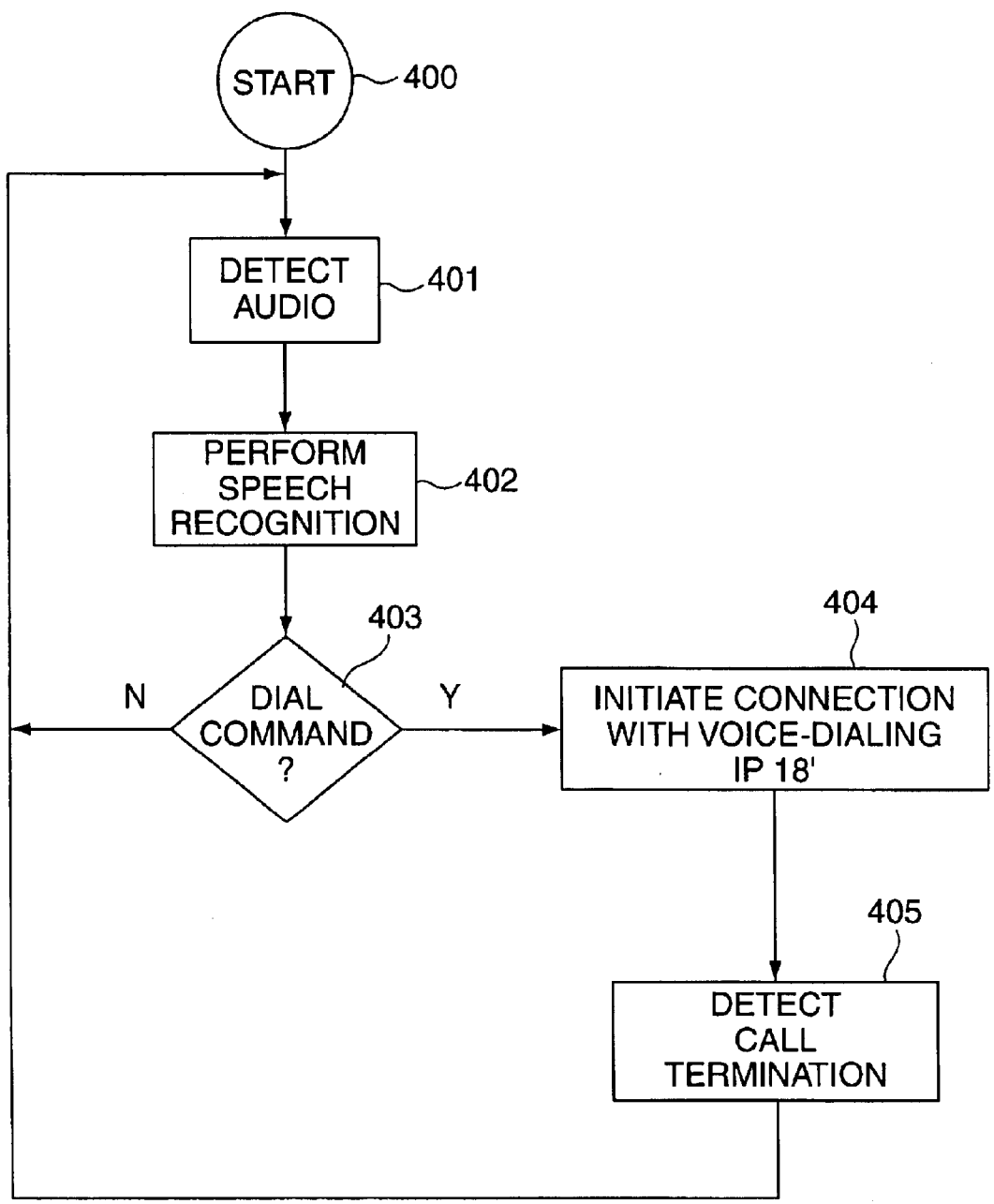
FIG. 4 is a flow chart illustrating the steps associated with initiating a voice-dialing operation in accordance with the present invention.

FIG. 4 shows a high-level flow chart that illustrates a procedure for initiating a voice-dialing operation in accordance with the present invention. The FIG. 4 procedure will first be described with respect to initiating a telephone call with intelligent speakerphone 250. It is noted, however, that the FIG. 4 procedure is applicable to operation of the other embodiments disclosed in FIGS. 5–7, as will be discussed below.

Referring now to FIG. 4, start step 400 begins when power to intelligent speakerphone 250 switches on. This startup action causes the various telephone circuits to initialize and places the phone in an on-hook state, with microphone 258 enabled. Next, in step 401, audio signals output by the microphone 258 are monitored to detect audio signals, e.g., signals above a pre-selected background noise threshold. Operation proceeds from step 401 to step 402, where interface routines 265 cause I/O interface 251 to sample and digitize the detected audio at microphone 258. Interface routines 265 may divide the digital audio into sets of samples representing audio segments for processing by speech recognition routines 264. Processing the audio data essentially involves conventional procedures of ascertaining if a positive match exists between a previously stored speech recognition model 269 (e.g., a dial command such as "dial") and the audio data being processed.

In step 403 a determination is made as to whether or not a signal representing a dial command was detected in step 402. If a dial command is not detected in step 402, the process exits decision step 403 via its no (N) path and returns to step 401 wherein the phone continues to monitor for audio input.

If, however, a dial command is detected in step 402, operation proceeds via step 403 to step 404. In step 404, control routine 263 automatically places intelligent speakerphone 250 in an off-hook condition resulting in the phone 250 being automatically connected to voice-dialing IP 18' assuming use of the NFA protocol. In step 404 the speakerphone 250 actually dials a telephone number corresponding to the IP and provides the user's PIN, e.g., in the form of DTMF signals, to the IP in embodiments where the NFA protocol is not used. At this point, the caller proceeds with a routine voice-dialing operation, e.g., the caller states the name of the party to be called, with the call being terminated in the usual manner, e.g., by a party hanging up.

From step 404 operation proceeds to step 405 wherein the speakerphone detects the termination of the connection with the IP 18' or destination device to which the user is connected via the voice dialing operation. The process remains at step 405 until a call termination condition is detected. In this regard, intelligent speakerphone 250 will detect a call termination condition when speakerphone 250 is manually or otherwise returned to an on-hook condition. Upon detecting a call termination condition in step 405, the process returns to detect step 401.

In one embodiment an oral hang-up command is monitored for and used to indicate call termination. If an oral hang-up command is detected in step 405, e.g., through the use of speech recognition, the speakerphone 250 is returned to an on-hook status and operation proceeds to step 401. When a handset is physically in an off-hook state as indicated, e.g., by the state of a cradle switch, the feature of monitoring for an oral hang-up command is disabled since the status of the cradle switch would result in the phone immediately going off-hook after being re-set to an on-hook state.

Figure 5:
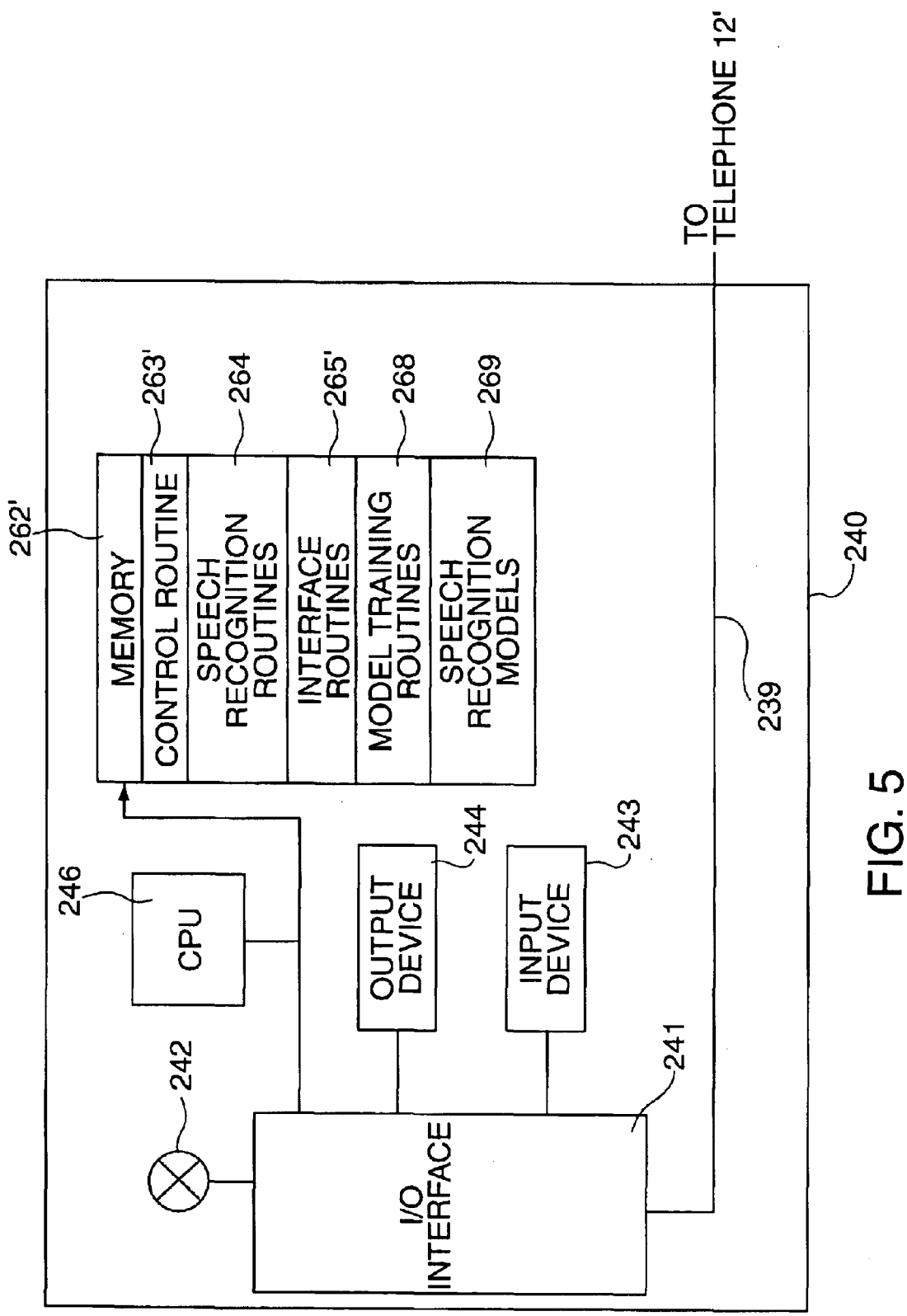
FIG. 5 illustrates a telephony control device implemented in accordance with another embodiment of the present invention.

As mentioned above with respect to FIG. 2 and detailed in FIG. 5, communication device 111 represents an embodiment of the invention that comprises the combination of a stand-alone telephony control device, i.e., voice-dialing control device 240, and a conventional, externally controllable speakerphone, i.e., speakerphone 12'. As seen in FIG. 5, voice-dialing control device 240 comprises I/O interface 241 which is coupled to an external input on telephone 12' via control line 239. Control line 239 may be, e.g., an RS-232 cable or universal serial bus (USB) comprising, e.g., one or more wires. Also connected to I/O interface 241 are microphone 242, input device 243 (e.g., push-button keys) and output device 244, e.g., indicator lights. A bus connects memory 262' which is similar to the previously discussed memory 262, and CPU 261 to I/O interface 241.

Stored within memory 262' are control routines 263', speech recognition routines 264, interface routines 265', model training routines 268 and speech recognition models 269. The instructions and data stored within memory 262' permit voice-dialing control device 240 to selectively control speakerphone 12' to perform the typical functions, e.g., go off-hook and dial, associated with a standard speakerphone. The control routines 263 include instructions and/or data which enable voice-dialing control device 240 to initiate an off-hook condition and/or control the telephone 12' to; dial a telephone number corresponding to the IP 18' in accordance with the present invention.

Initialization and generation of the speech models 269 may occur in the manner described above with respect to speakerphone 250.

Communication device 111, which comprises the combination of the control device 240 and speakerphone 12' operates substantially in accordance with the process of FIG. 4. Notably, however, the speech recognition and control functions are primarily performed by the control device 240 as opposed to being performed internal to the speakerphone 12'.

As depicted in FIG. 2, communication devices 112 and 113 represent embodiments of the invention that incorporate personal computers 202. In communication device 112, first personal computer 202 connects directly to CO switch 20 and functions as a stand-alone computer/telephony device. In the case of communication device 113, second personal computer 202 functions as a control device for a second speakerphone 12', which connects to CO switch 20.

Figure 6:
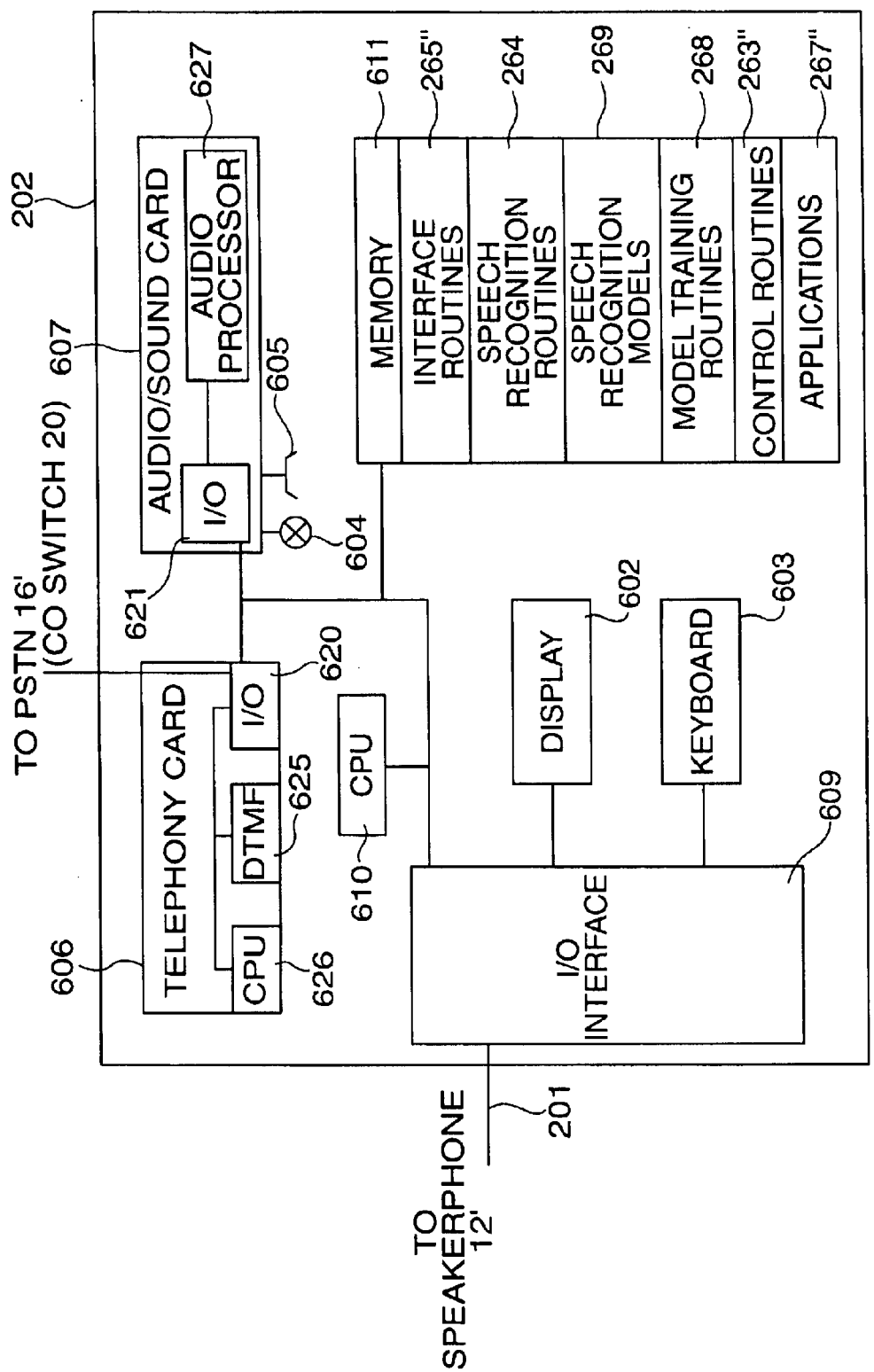
FIG. 6 illustrates a telephony device capable of computer implementation in accordance with another embodiment of the present invention.

FIG. 6 schematically illustrates first and second personal computers 202. Computers 202 comprise a number of conventional peripherals, including video display 602, keyboard 603, microphone 604, loudspeaker 605, telephony card 606 and audio/sound card 607. In a typical application, personal computers 202 would normally include a variety of other peripherals, e.g., pointing devices, printers, disk drives, etc., which FIG. 6 omits for simplicity.

Computers 202 further include I/O interface 609, CPU 610 and memory 611. A bus connects I/O interface 609 to CPU 610, memory 611, I/O interface 620 on telephony card 606, and I/O interface 621 on audio/sound card 607. Control line 201 extends from I/O interface 609 to an external control input on speakerphone 12'. Telephony card 606 includes a bus that connects DTMF detector/generator 625 and CPU 626 to I/O interface 620. A communication line extends from I/O interface 620 to CO switch 20 in PSTN 16'. Audio/sound card 607 includes a bus that connects audio processor 627 to I/O interface 621, which in turn connects to microphone 604 and loudspeaker 605.

Stored within memory 611 are computer routines and data suitable for enabling computers 202 to operate in either of two voice dialing modes, i.e., a stand-alone mode and a control mode. When performing as communication device 112, computer 202 operates in a stand-alone mode, functioning as a self-contained telephony device. When performing as a component of communication device 113, computer 202 operates in a control mode, functioning as an external control for speakerphone 12'. To perform in this mode, memory 611 comprises the following routines and data: interface routines 265", speech recognition routines 264, speech recognition models 269, model training routines 268, control routines 263" and application routines 267".

During initial setup of communication device 112 and 113, control routine 263" prompts a subscriber, via display 602 and/or loudspeaker 605, to speak a dial command e.g., "dial," one or more times. Upon detection of the spoken dial command by microphone 242, interface routines 265" cause I/O interface 241 to suitably sample, digitize and format the audio input from microphone 242 before passing the audio on as data to CPU 246 where it is processed by model training routines 268. A user may use the previously described alternative procedure of using the IP 18' to generate speech models 212 for use as speech models 269 if desired.

During operation in the stand alone mode, the computer 202 operates in generally the same manner as the speakerphone 250 with the telephony card 606 being used to perform IP connection and/or dialing operations and the microphone of the audio card 607 being used to detect sound input. In the control mode of operation, the telephony card 606 need not be used. Sound is detected by the audio cards microphone 604 and, under control of the routines stored in the memory 611, processed by the audio processor 627 and/or CPU 610. The CPU 610 controls the second speakerphone 12' in generally the same manner that the control device 240 controls the first speakerphone 12'.

The voice dialing features of the present invention described above can be readily incorporated into a cellular telephone 214. Such a telephone would be similar in construction to the phone described in detail in FIG. 3 but would include receiver/transmitter circuitry, including the antennas, coupled to the I/O interface instead of the communication line 253. Accordingly, the present invention is directed to both land-line and cellular telephone embodiments.

As discussed above, the telephony devices of the present invention can use either speaker independent or speaker dependent speech recognition models for use as the dial command. When speaker independent models are used, the dial command is usually a pre-selected word which is used by multiple telephony devices. When speaker dependent speech recognition models are, used, the user of the individual telephony device normally selects the word or phrase to be used as the dial command. In cases where words other than "dial" are used as the dial command it is usually desirable that the word that is selected be one which is not likely to come up in ordinary speech to avoid the unintentional initiation of a voice dialing operation.

While the above discussion has primarily focused on single line telephone embodiments, the techniques of the present invention may be used with multi-line telephony devices. In multi-line applications, a different dial command may be used to initiate a voice dialing operation over each one of the different available telephone lines. For example, in the case of a three line phone, the phrase "Dial 1" may be used to initiate a voice dialing operation over line 1, the phrase "Dial 2" may be used to initiate a voice dialing operation over line 2, and the phrase "Dial 3" may be used to initiate a voice dialing operation over line 3.

While the voice dialing methods of the present invention have been described primarily in a telephone network embodiment, the methods of the present invention are not network dependent and can be implemented using a variety of communication lines and communications networks, e.g., digital voice/data lines and voice/data networks.

In addition to the embodiments described in detail above, the methods and apparatus of the present invention can be applied to telephony devices which use, e.g., the Internet, as opposed to the public telephone network, for the communication of voice signals. In such an embodiment, a server or other device capable of performing speech recognition and call routing functions is used in the communications network as opposed to the IP 18. In such an embodiment, an oral signal or command is used to instruct the telephony device to connect to the network server which performs routing based on verbal input. Speech recognition is performed in the server and routing is then performed as a function of the speech recognition result. In this manner a connection with a destination telephony device can be established via a first speech recognition operation performed in the source telephony device and a second speech recognition operation performed in a network device, e.g., gateway or gatekeeper.

While various exemplary embodiments of the hands free dialing method of the present invention have been described above, numerous additional communication device embodiments will be obvious to those of ordinary skill in the art in view of the above description.

What is claimed is:

1. A method of performing a voice dialing operation, the method including the steps of:
   establishing a connection between a telephony device and a network based speech recognition device located in a communications network, said telephony device being capable of coupling said user to, at most, one network based speech recognition device in response to detecting speech used to initiate a voice dialing operation, the step of establishing a connection including the steps of:
   operating the telephony device to perform speech recognition on audio signals received by the telephony device to determine if a word used to initiate a voice dialing operation was spoken; and
   in response to determining that the received audio signals include said word used to initiate a communication operation, connecting the telephony device to said network based speech recognition device;
   wherein said network based speech recognition device is an intelligent peripheral, the method further comprising the step of:
   operating the intelligent peripheral to perform a second speech recognition operation to determine at least part of a telephone number.

2. The method of claim 1, further comprising the step of:
   operating the intelligent peripheral to output a telephone number as a function of the result of the second speech recognition operation.

3. A method of performing voice dialing, the method including the step of:
   establishing a connection between a telephony device and a communications device located in a communications network, said communications device being a network based speech recognition device, said telephony device being capable of coupling said user to, at most, one network based speech recognition device in response to detecting speech used to initiate a voice dialing operation, the step of establishing a connection including the steps of:
   operating the telephony device to perform a first speech recognition operation on audio signals received by the telephony device to determine if a word used to initiate a voice dialing operation was spoken; and
   in response to determining that the received audio signals include said word used to initiate a communication operation, connecting the telephony device to said communications device;

wherein the first speech recognition operation attempts to recognize a first set of words; and wherein the second speech recognition operation involves examining audio signals obtained from the telephony device in an attempt to recognize a second set of words which includes at least three times the number of words included in the first set of words.

4. The method of claim 3, wherein the telephony device is a speakerphone.

5. The method of claim 3, wherein the telephony device is a cellular telephone.

6. The method of claim 3, wherein the telephony device includes a voice activated control device coupled to a controllable speakerphone.

7. The method of claim 3, wherein the telephone device is a telephony capable personal computer.

8. A method of performing a voice dialing operation, the method including the step of:

establishing a connection between a telephony device and a communications device located in a communications network, said communications device being a network based speech recognition device, said telephony device being capable of coupling said user to, at most, one network based speech recognition device in response to detecting speech used to initiate a voice dialing operation, the step of establishing a connection including the steps of:

operating the telephony device to perform speech recognition on audio signals received by the telephony device to determine if speech used to initiate a voice dialing operation was spoken, said speech recognition including a first speech recognition operation; and in response to determining that the received audio signals include speech used to initiate a voice dialing operation: i) connecting the telephony device to said communications device, ii) operating said communications device to perform a second speech recognition operation, and iii) connecting the telephony device to an additional telephony device using a telephone number determined by the communications device as a function of said second speech recognition operation;

wherein the first speech recognition operation attempts to recognize a first set of words; and wherein the second speech recognition operation involves examining audio signals obtained from the telephony device in an attempt to recognize a second set of words which includes at least fifteen times the number of words included in the first set of words.

9. The method of claim 8, wherein the intelligent peripheral is a voice dialing peripheral device in a public telephone switching network.

10. A system for performing a voice dialing operation, comprising:

a first telephony device including first means for performing speech recognition on speech received by the first telephony device to detect the presence of speech used to initiate a voice dialing operation, said first telephony device being capable of coupling said user to, at most, one network based speech recognition device in response to detecting speech used to initiate a voice dialing operation; and a communications network, coupled to the telephony device, the communications network including:

i. said one network based speech recognition device, said one network based speech recognition device including second means for performing speech recognition on audio signals received from the first telephony device; and ii. means for routing signals from the first telephony device to a second telephony device, the routing being performed as a function of the result of a speech recognition operation performed on speech received from the first telephony device.

11. The system of claim 10, wherein the first and second telephony devices are personal computers.

12. The system of claim 11, wherein the communications network further includes:

means for generating a speech recognition model from speech provided by the first telephony device; and means for outputting the generated speech recognition model to said first telephony device.

13. The system of claim 12, wherein the first telephony device includes:

means for storing the speech recognition model.

14. The system of claim 10, wherein the first means for performing speech recognition includes speech recognition circuitry.

15. The system of claim 10, wherein the means within said communications network for performing a speech recognition operation is a network server.

16. The system of claim 10, wherein the communications network is the Internet.

* * * * *